United States Patent Office 3,229,001
Patented Jan. 11, 1966

---

3,229,001
(THIO)PHOSPHORIC (PHOSPHONIC, PHOSPHINIC) ACID ESTERS AND PROCESSES FOR THEIR PRODUCTION
Gerhard Schrader, Wuppertal-Cronenberg, Germany, assignor to Farbenfabriken Bayer Aktiengesellschaft, Leverkusen, Germany, a German corporation
No Drawing. Filed Nov. 30, 1961, Ser. No. 156,134
Claims priority, application Germany, Dec. 2, 1960, F 32,680
13 Claims. (Cl. 260—948)

The present invention relates to and has as its objects some new and useful insecticidal compounds and a new process for their production. The partially new compounds which are objects of this invention may be shown by the following general formula

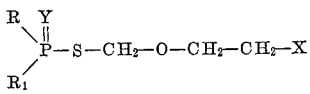

In this formula R and $R_1$ stand for lower alkoxy, alkylmercapto radicals or optionally also for lower alkyl, radicals, and X stands for chlorine or bromine or for any aliphatic, cycloaliphatic, aliphatic-aromatic or aromatic substituted mercapto radical and Y stands for a chalkogen having an atomic weight less than 40.

Compounds are known which are made by esterifying α-chloromethyl ethers or -thioethers (which are readily obtainable from alcohols or and mercaptans, formaldehyde and hydrochloric acid) with dialkyl-dithiophosphoric acids.

In accordance with the present invention it has now been found that there may readily be obtained from ethylene-halo-hydrines, formaldehyde and hydrochloric acid the β-halo-ethyl-α'-chloromethyl ether of the following composition:

$$Cl—CH_2—O—CH_2—CH_2—Hal \quad (Hal=Cl, Br)$$

and it has further been found that this β-bromo-ethyl-α'-chloromethyl ether readily reacts with mono- or dithio-phosphoric (-phosphonic, phosphinic) acids in such a manner that compounds of the above said general composition are formed, in which X stands for chlorine or bromine.

Finally, it has been found that the halogen in the aforesaid compounds may easily be exchanged for any desired mercaptan radicals even at lower temperatures, compounds of the general composition thus being formed, in which X stands for the above said substituted mercapto group.

The exchange of halogen for the mercaptan radical is advantageously carried out in the presence of a suitable acid-binding agent. Sodium alcoholates have proved to be especially suitable for this purpose. The exchange of halogen for the mercaptan radicals is furthermore preferably effected in an inert solvent. Suitable inert solvents are chiefly benzene, toluene and anhydrous ether.

Some dithiophosphoric acid esters of the above formula are already known from Acta chimica sinica 25 (1959) page 408. According to the description of this publication these esters are obtained by condensation of dithiophosphoric acids, mercaptans or alcohols and aldehydes; however, by this method of operation the compounds are obtained, if at all, in a very small yield and in a state of very great impurity, whereas by the stepwise method of production according to the present invention, the compounds are obtainable in a very good yield and in great purity.

Except for the aforementioned dithiophosphoric acid esters the compounds obtained according to the new process have not yet been described in the literature. All compounds are distinguished by their markedly systemic action in addition to generally good insecticidal properties. They very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001 to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae

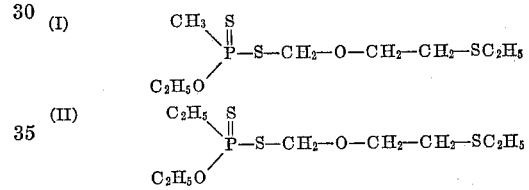

have been tested against flies and caterpillars respectively. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture is then diluted with water to the desired concentration. The tests have been carried out as follows:

(a) Against flies (*Musca domestica*). About 50 flies are placed under covered petri dishes in which drip wet filter papers have been placed which are sprayed with an insecticidal solution of a concentration as shown below. The living status of the flies has been determined after 24 hours. The following result has been obtained:

| Compound | Aqueous concentration (in percent active ingredient/water) | Killing rate (in percent) |
|---|---|---|
| (I) | 0.001 | 100 |

(b) Against caterpillars: white cabbage has been sprayed drip wet with aqueous emulsions as prepared above in a concentration as indicated below. Caterpillars (of the type diamond black moth, 10 each) have been placed on the sprayed leaves of the white cabbage. The living status has been determined after 24 hours and 48 hours. The result is to be seen from the following table:

| Compound | Aqueous concentration (in percent active ingredient/ water) | Killing rate (in percent) |
|---|---|---|
| (II) | 0.1 | 100 |

The following examples are given for the purpose of illustrating the process according to the present invention.

*Example 1*

186 grams (1 mol) of diethyl-dithiophosphoric acid are placed in a flask equipped with an agitator. 174 grams (1 mol) of β-bromoethyl-α'-chloromethyl ether (B.P. 38° C./2 mm. Hg) are added with stirring. Stirring is continued at 60° C. for one hour. The bulk of the hydrochloric acid formed in the reaction is then split off. The reaction product is taken up in 300 cc. of benzene and washed neutral with water. The reaction product is subsequently dried with sodium sulfate and fractionated. Thus, 220 grams of the ester of the following formula

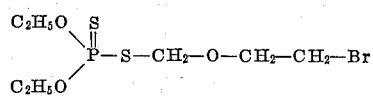

and of B.P. 88° C./0.01 mm. Hg are obtained. Yield 68% of the theoretical.

By the same way there may be obtained the compound of the following formula

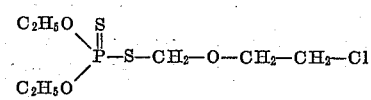

16 grams (0.25 mol) of ethyl-mercaptan are dissolved in 100 cc. of benzene with the addition of a solution ethylate solution containing 0.25 mol of sodium. 81 grams (0.25 mol) of the ester obtained are added dropwise at 20° C. with stirring. Stirring is continued for one hour and the reaction product then taken up in 300 cc. of benzene. The benzene solution is washed neutral with water and then dried with sodium sulfate. Upon fractionation there are obtained 42 grams of the end product having the following constitution:

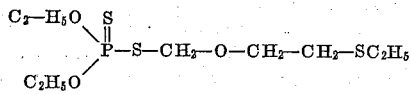

and a B.P. of 96° C./0.01 mm. Hg. Yield 55% of the theoretical.

By the same way there may be obtained the compounds of the following formulae:

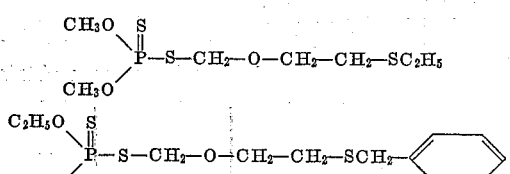

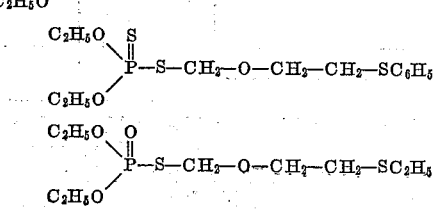

*Example 2*

156 grams (1 mol) of methyl-thionophosphone-O-ethyl ester thiolic acid of B.P. 32° C./0.05 mm. Hg are dissolved in 100 cc. of benzene. 174 grams (1 mol) of β-bromoethyl-α'-chloromethyl ether are added at 50° C. with stirring. Stirring is continued for one hour at 50° C. The evolution of hydrochloric acid has then ceased. The reaction product is taken up in 300 cc. of benzene. The benzene solution is washed neutral with water, dried with sodium sulfate and subsequently fractionated. In this way, 172 grams of the new ester of B.P. 80° C./0.01 mm. Hg are obtained. Yield 59% of the theoretical.

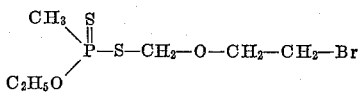

By the same way there may be obtained the compound of the following formula

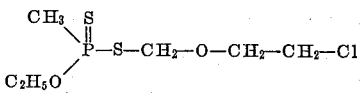

74 grams (0.25 mol) of the β-bromoethyl ester thus obtained are run at 20° C. with stirring into a solution of 16 grams (0.25 mol) of ethyl-mercaptan in 150 cc. of benzene and a sodium ethylate solution containing 0.25 mol of sodium. Stirring is continued at 20° C. for one hour, and the reaction product then taken up in 200 cc. of benzene, and washed neutral with water. After drying with sodium sulfate, it is fractionated. In this way 46 grams of the new ester

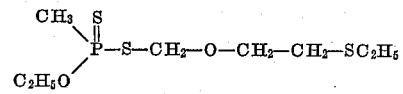

of B.P. 96° C./0.01 mm. Hg are obtained. Yield 67% of the theoretical.

By the same way there may be obtained the compounds of the following formulae:

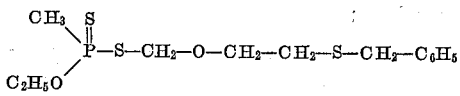

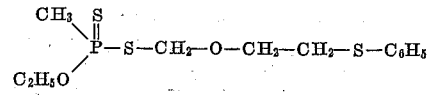

*Example 3*

170 grams (1 mol) of ethyl-thionophosphone-O-ethyl ester thiolic acid of B.P. 38° C./0.01 mm. Hg are dissolved in 100 cc. of benzene. 174 grams (1 mol) of β-bromo-ethyl-α-chloromethyl ether are added dropwise at 50° C. The temperature is maintained at 50° C. for one hour. The formation of hydrochloric acid has then ceased. The reaction product is taken up in 300 cc. of benzene, washed neutral with water and subsequently dried with sodium sulfate. In this way, 170 grams of β-bromoethyl ester of the formula

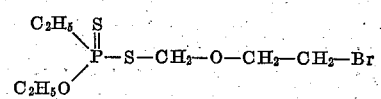

and of B.P. 82° C./0.01 mm. Hg are obtained. Yield 55% of the theoretical.

16 grams (0.25 mol) of ethyl-mercaptan are dissolved in 150 cc. of benzene with the addition of a sodium ethylate solution containing 0.25 mol of sodium. 77 grams (0.25 mol) of the β-bromoethyl ester thus obtained are added dropwise at 20° C. with stirring. Stirring is continued at 20° C. for one hour, the product is then diluted with 200 cc. of benzene, washed neutral with water and dried with sodium sulfate. Upon fractionation, 53 grams of the new ester of the formula

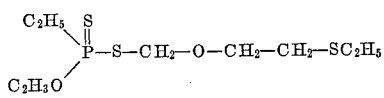

and of B.P. 98° C./0.01 mm. Hg are obtained. Yield 74% of the theoretical.

*Example 4*

126 grams (1 mol) of dimethyl-thionothiol-phosphinic acid (M.P. 59° C.) are dissolved in 100 cc. of benzene. 174 grams (1 mol) of β-bromoethyl-α'-chloromethyl ether are added at 45° C. Stirring is continued at 50° C. for one hour. The formation of hydrochloric acid has now ceased. The reaction product is taken up in 300 cc. of benzene, washed neutral with water and dried with sodium sulfate. Upon distilling off the solvent, 198 grams of β-bromoethyl ester of the formula

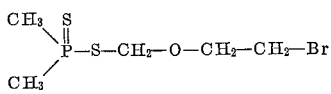

are obtained. Yield 75% of the theoretical.

16 grams (0.25 mol) of ethyl-mercaptan are dissolved in 150 cc. of benzene with the addition of a sodium ethylate solution containing 0.25 mol of sodium. 66 grams (0.25 mol) of the above β-bromoethyl ester are added at 15-20° C. to this solution. Stirring is continued for one hour at 20° C. and the reaction product is then taken up in 200 cc. of benzene. It is washed neutral with water, the benzene solution then dried with sodium sulfate and fractionated. In this way, 32 grams of the new ester of the following formula

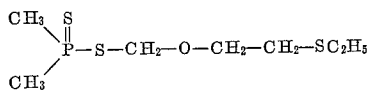

and of B.P. 87° C./0.01 mm. Hg are obtained. Yield 53% of the theoretical.

*Example 5*

154 grams (1 mol) of diethyl-thionothiolphosphinic acid are dissolved in 100 cc. of benzene. 174 grams (1 mol) of β-bromoethyl-α'-chloromethyl ether are added at 50° C. with stirring. After warming the mixture for one hour, the formation of hydrochloric acid has ceased. The reaction product is taken up in 200 cc. of benzene, washed neutral with water and dried with sodium sulfate. After distilling off the solvent, 215 grams of β-bromoethyl ester of the formula

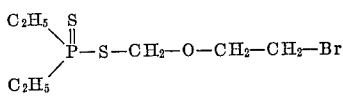

are obtained. Yield 74% of the theoretical.

73 grams (0.25 mol) of the above β-bromoethyl ester are added dropwise at 20° C. with stirring to a solution of 16 grams (0.25 mol) of ethyl-mercaptan in 150 cc. of benzene and a sodium ethylate solution containing 0.25 mol of sodium; stirring is continued at 20° C. for one hour, and the reaction product then diluted with 300 cc. of benzene, washed neutral with water and dried with sodium sulfate. Upon fractionation, 45 grams of the new ester of the formula

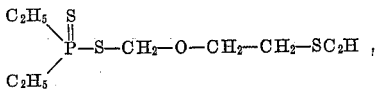

and of B.P. 106° C./0.01 mm. Hg are obtained. Yield 66% of the theoretical.

I claim:
1. A compound of the formula

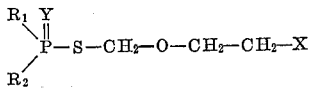

wherein Y stands for a chalkogen of an atomic weight less than 40, $R_1$ stands for a member selected from the group consisting of lower alkyl and lower alkoxy, $R_2$ stands for lower alkyl and X stands for a member selected from the group consisting of chlorine, bromine, and lower alkyl mercapto.

2. The compound of claim 1 wherein $R_1$ and $R_2$ are lower alkyl and X is lower alkyl mercapto.

3. The compound of claim 1 wherein $R_1$ is lower alkoxy, $R_2$ is lower alkyl and X is lower alkyl mercapto.

4. The compound of claim 1 wherein $R_1$ is lower alkoxy, $R_2$ is lower alkyl and X is chlorine.

5. The compound of claim 1 wherein $R_1$ and $R_2$ are lower alkyl and X is chlorine.

6. The compound of claim 1 wherein $R_1$ is lower alkoxy, $R_2$ is lower alkyl and X is bromine.

7. The compound of claim 1 wherein $R_1$ and $R_2$ are lower alkyl and X is bromine.

8. The compound of the following formula

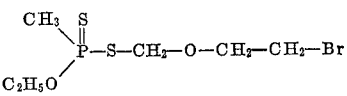

9. The compound of the following formula

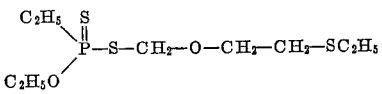

10. The compound of the following formula

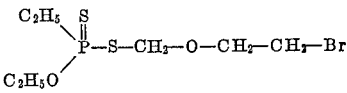

11. The compound of the following formula

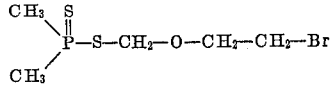

12. The compound of the following formula

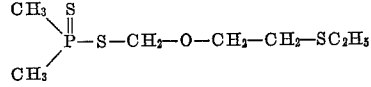

13. Process for the production of a compound of the following formula

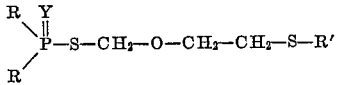

in which Y stands for a chalkogen of an atomic weight less than 40, R stands for a member selected from the group consisting of lower alkyl and lower alkoxy, and R' stands for a member selected from the group consisting of lower alkyl, benzyl and phenyl, which comprises reacting β-halo-ethyl-α'-chloromethyl ether with a member selected from the group consisting of monothiophosphoric acids, monothiophosphonic acids, dithiophosphonic acids, monothiophosphinic acids and dithiophosphinic acids, and then reacting the resultant β-halo-ethyl esters with corresponding members selected from the group consisting of lower alkyl, benzyl and phenyl.

References Cited by the Examiner

UNITED STATES PATENTS

| | | | |
|---|---|---|---|
| 2,565,920 | 8/1951 | Hook et al. | 260—461 |
| 2,565,921 | 8/1951 | Hook et al. | 260—461 |
| 2,571,989 | 10/1951 | Schrader | 260—461 |
| 2,586,655 | 2/1952 | Hook et al. | 260—461 |
| 2,596,076 | 5/1952 | Hook et al. | 260—461 |
| 2,614,988 | 10/1952 | Hook et al. | 260—461 |
| 2,884,353 | 4/1959 | Christman | 260—461 |
| 2,885,430 | 5/1959 | Scherer et al. | 260—461 |
| 3,004,980 | 10/1961 | Schrader | 260—461 |

FOREIGN PATENTS 947,369    8/1956    Germany.

OTHER REFERENCES

Clark et al.: "J. Agr. Food Chem.," vol. 3, pp. 834–836 (1955).

Kabachnik et al.: "Zhur. Obshchei Khim.," vol. 28, pp. 1568–1573 (1958).

Yang et al.: "Hua Hsueh Hsueh Pao," vol. 25, pp. 402–408 (1959). (Abstracted in "Chem. Abst.," vol. 54, Col. 19467–8 (Oct. 10, 1960).)

CHARLES B. PARKER, *Primary Examiner.*

MORRIS LIEBMAN, IRVING MARCUS, *Examiners.*